United States Patent
Daly

(10) Patent No.: US 8,120,717 B2
(45) Date of Patent: *Feb. 21, 2012

(54) METHODS AND SYSTEMS FOR DISPLAY VIEWER MOTION COMPENSATION

(75) Inventor: Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1394 days.

This patent is subject to a terminal disclaimer.

(21) Appl. No.: 11/680,522

(22) Filed: Feb. 28, 2007

(65) Prior Publication Data

US 2008/0199167 A1   Aug. 21, 2008

Related U.S. Application Data

(60) Provisional application No. 60/890,897, filed on Feb. 21, 2007.

(51) Int. Cl.
   *H04N 5/64* (2006.01)
(52) U.S. Cl. .......................................... 348/838; 348/839
(58) Field of Classification Search .................. 348/838, 348/77, 78, 837, 839
   See application file for complete search history.

(56) References Cited

U.S. PATENT DOCUMENTS

| | | | |
|---|---|---|---|
| 4,637,571 A | 1/1987 | Holder et al. |
| 5,497,191 A | 3/1996 | Yoo et al. |
| 5,845,158 A | 12/1998 | Ogawa et al. |
| 5,857,122 A | 1/1999 | Miyamoto et al. |
| 6,467,207 B1 | 10/2002 | Jones et al. |
| 6,618,203 B2 | 9/2003 | Nakamura et al. |
| 6,679,899 B2 | 1/2004 | Wiener et al. |
| 7,081,870 B2 | 7/2006 | Bronson |
| 7,088,516 B2 | 8/2006 | Yagi et al. |
| 2002/0003591 A1 | 1/2002 | Giannatto |
| 2004/0208394 A1 | 10/2004 | Kurata |
| 2006/0280249 A1 | 12/2006 | Poon |
| 2007/0126928 A1 | 6/2007 | Klompnhouwer et al. |

FOREIGN PATENT DOCUMENTS

| JP | 8-328519 A | 12/1996 |
|---|---|---|
| JP | 10-69266 A | 3/1998 |
| JP | 2004-343622 A | 12/2004 |

OTHER PUBLICATIONS

International Search Report PCT/JP2008/072109.

*Primary Examiner* — Basil Katcheves

(74) *Attorney, Agent, or Firm* — Krieger Intellectual Property, Inc.; Scott C. Krieger

(57) ABSTRACT

Embodiments of the present invention comprise systems and methods for compensating for motion of a viewer relative to a display device.

20 Claims, 3 Drawing Sheets

Head Position Sensor

Display Position Sensor

Viewing Distance

METHODS AND SYSTEMS FOR DISPLAY VIEWER MOTION COMPENSATION

RELATED REFERENCES

This application claims the benefit of U.S. Provisional Patent Application No. 60/890,897, entitled "Methods and Systems for Display Viewer Motion Compensation," filed Feb. 21, 2007, by Scott Daly.

FIELD OF THE INVENTION

Embodiments of the present invention comprise methods and systems for modifying a displayed image to compensate for relative motion between a viewer's head and a display.

BACKGROUND

Mobile displays are increasingly being used to watch video. Currently their quality, in terms of pixel dimensions, contrast ratio, color gamut and bit-depth are typically inferior to stationary counterparts such as LCD TVs. However, in some applications, the quality lost due to these inferiorities may be acceptable when balanced with the increased convenience of a smaller mobile display. While the quality and performance of mobile displays is rapidly increasing, their size is an element of their portability and will always be less than that of stationary devices. The small size of these mobile displays generally results in a smaller field of view, which may be quantified in visual degrees. Viewing distance may also affect the field of view and a varying viewing distance can have a detrimental impact on viewing quality.

An important and frequent application for mobile displays is viewing image and video content during transportation. This may occur while commuting or traveling on a bus, subway, train, airplane or other vehicle. Even vehicle operators may use mobile or compact vehicle displays for navigation and vehicle condition assessment. Small displays are often used for automobile and airplane navigation and instrumentation. In these transportation applications, there is often a great deal of movement of the user relative to the display. This is often the result of irregular roadway surfaces or atmospheric conditions, which can jostle and bump a user relative to the vehicle and/or display. This movement often results in an undesirable and aperiodic vibration or random shaking, which makes video and image consumption difficult.

During transportation, a display may be difficult to see for a number of reasons. Fine details (high spatial frequencies) may be "smeared" due to motion blur. This can be caused by relative motion between the display and the eye combined with the eye's temporal response. Multiple edges can also cause undesirable masking throughout the image. The shaking display may contain multiple edges due to saccadic eye movements that don't land where they are anticipated due to the relative motion. Motion sickness can also affect video quality. This may be caused by a mismatch between eye movements and the vestibular canals of the ear. Headaches also often result from video consumption while traveling. This may result from excessive corrective eye movements and possible motion blur and multiple edge factors.

SUMMARY

Some embodiments of the present invention comprise methods and systems for modifying a displayed image to compensate for relative motion between a viewer's head and a display.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention may substantially reduce the visual effects due to aperiodic vibration in mobile displays. Some embodiments may widen the field of view of a mobile display. Some embodiments may comprise a zooming technique for some motion compensation.

Embodiments of the present invention may comprise position-sensing technology to compensate the displayed image so that its relative position stays more stable in the visual field of view. While these methods create a more visually-stable image, the borders of the display may still suffer from the effects of aperiodic vibration. This can result in a fuzzy or nebulous border around the display.

Figure 1:
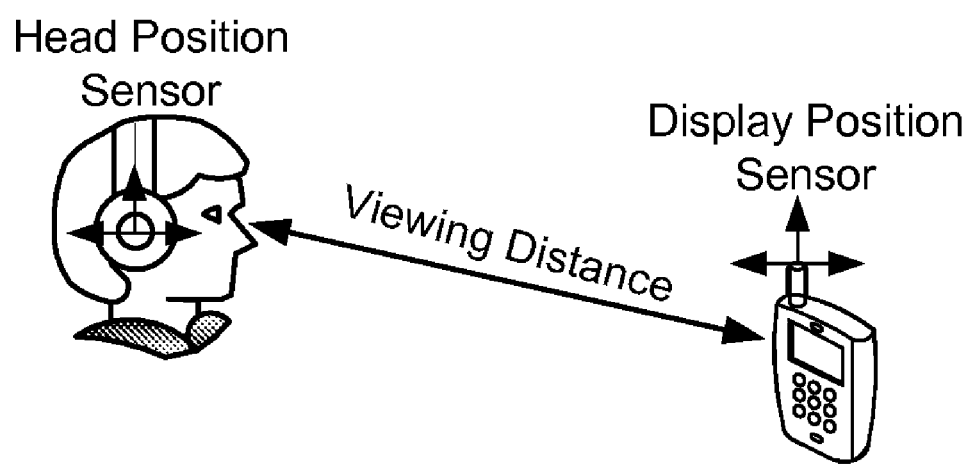
FIG. 1 is a diagram showing display viewer and exemplary sensor locations.

Some embodiments of the present invention may be described in relation to FIG. 1. These embodiments may comprise a head position sensor 2 and a display position sensor 4. In some embodiments the head position sensor 2 may be a transmitter and the display position sensor 4 may be a receiver. In other embodiments, the display position sensor 4 may comprise a transmitter and the head position sensor 2 may comprise a receiver. In some embodiments, both sensors 2 and 4 may comprise a transceiver. In some embodiments, head sensor 2 and display sensor 4 may receive or transmit signals to or from another device and may make position measurements relative to another device. In some embodiments, sensors 2 and 4 may communicate with or make measurements relative to a satellite. In some embodiments sensors 2 and 4 may make measurements relative to an electromagnetic field generated by a third device.

Some embodiments may comprise instrumentation for measuring the relative position of one sensor 2 or 4 relative to the other sensor 2 or 4. In some embodiments, the relative position of the sensors 2 and 4, may be dynamically measured. Typically, the head position sensor 2 is placed on the user's head. In some embodiments, the head sensor 2 may be attached to or integral with an audio headset, helmet, eyewear or other headgear. In some embodiments, the display sensor 4 may be attached to or integral with a display or display device.

In some embodiments, sensors 2 and 4 may measure a position and an orientation.

Some embodiments of the present invention may comprise a wireless communication link between a head sensor 2 and a display sensor 4. Some embodiments may comprise a wired connection between head sensor 2 and display sensor 4. In some embodiments a wired connection may be embedded in a user's clothing.

In some embodiments, the temporal response of the sensors 2 and 4 may be matched to the display image update rate. In some of these embodiments, the temporal response and update rate may be 60 Hz. In some embodiments, the positional accuracy of sensors 2 and 4 is within one pixel dimension. In other embodiments, the positional accuracy may be more than or a multiple of a display pixel dimension. In some embodiments, the range of the communication link between sensors 2 and 4 will be at least one meter.

An exemplary embodiment of the present invention may comprise the following specifications:
    Wireless communication
    0.038 mm resolution at 30 cm range
    7.4×4×2 cm sensor 1
    6.4×3.6×3.6 cm sensor 2
    188 Hz
    0.254 cm static accuracy
    latency 5 ms (~⅓ video frame)

Of course, some embodiments may comprise very different specifications and characteristics. In some embodiments, sensor units may be much smaller and, in some cases, may use MEMS accelerometers to reduce size. In some embodiments, multiple head and/or body sensors may be used to detect viewer location and orientation. In some embodiments, sensors may detect motion and position of multiple body elements and characteristics. In some embodiments, the viewer's head, neck, shoulders and other body parts may be tracked. In some embodiments, facial movement and conditions may be tracked to determine viewer fatigue, squinting, eye strain, and other viewer characteristics. In some embodiments, viewer eye position, movement and other characteristics, e.g., retinal characteristics, pupil dilation and other characteristics, may be measured, tracked and used for image modification to improve viewer image consumption.

In some embodiments of the present invention a source image may be treated or processed to have larger dimensions than a display. In some embodiments, a VGA image may be displayed on a QVGA display. In other embodiments, an HDTV signal may be displayed on an SDTV display. In other embodiments, an image that has the same or smaller size and resolution as a target display may be scaled, upsampled or extrapolated to a larger size for the purposes of implementing aspects of embodiments of the present invention. In some embodiments, an image may be stored in a buffer that is larger than the display.

In some embodiments of the present invention, a coordinate system may be established relative to the display. The horizontal and vertical dimension may correspond to dimensions within the plane of the display and a "z" dimension may be perpendicular to the plane of the display. In these embodiments, an image, which is larger than the display, may be shifted or translated relative to the horizontal and vertical axes in response to movement of the user's head relative to the display. In some embodiments, a zoom function may be implemented at the display in response to movement of the user's head along the z-axis relative to the display. In some embodiments, conversion from the physical position changes to image shifting units in pixels may be implemented as a mere calibration without computation.

In some embodiments, the input image may be processed or otherwise scaled to exceed the display size by an amount that is proportional to the amount of movement between a user's head and the display. This movement may be determined or sampled for a period of time prior to image display to determine the size of the image to be stored in the buffer. For video applications, a statistical sampling of the image size needed for a number of previous frames or fields may be used to determine the size of a stored video frame or field.

In embodiments of the present invention comprising Liquid Crystal Displays (LCDs) and other technologies, rapid shifting of image data on the display may lead to motion blur. This may be due to the hold-type blur of the display and/or the blur caused by the temporal response. In some embodiments, this can be corrected by performing a motion compensated inverse spatial filtering process. In these embodiments, a motion may be compensated through spatial shifting of the image relative to the display. This is typically a global motion for an entire frame to compensate for a shaking component. Consequently, the blur will have the same magnitude over the entire image and can be compensated with an inverse spatial filter depending on the motion speed and direction. In some embodiments, this inverse spatial filter may be implemented as a 1-D filter for a given video frame, but its orientation may change.

In some embodiments, this filter process may comprise one or more of the following steps:
    calculation of spatial width
    calculation of shape in amplitude
    calculation of the orientation of a global motion vector
    calculation of a 1-D oriented inverse spatial filter
    application of the inverse spatial filter to remove spatial blur Some embodiments of the present invention may comprise a soft aperture process. A display with a sharp edge surrounding the display area may suffer from diminished display quality when the display is subjected to random shaking or vibration. The shaking display can result in multiple visible display edges around the displayed image. Likewise, when an image is shifted or translated in response to relative motion between a user's head and the display, the display boundary "moves" relative to the image and can cause multiple edges to appear. This effect may be corrected, at least in part, by the use of a soft aperture. The soft aperture process allocates a strip of pixels around the boundary of the display to act as a transition zone to soften the hard edge of the display. This may be done by displaying, in the display boundary region, an image that transitions from the display image to an image that approximates the color and/or luminance of the edge of the device around the display. For example, a device with a black surround around its display may use a soft aperture that transitions to black at its exterior boundary. As another example, a device with a bright metal or white surround around its display may use a soft aperture to transition to white. Similarly, a color-display device with a colored display surround, may use a colored soft aperture.

In some embodiments, the size or extent of the soft aperture may vary in relation to the magnitude of the movement between a user's head and the display device. For example, when high amplitude vibration is present, the width of a soft aperture may increase.

Figure 2:
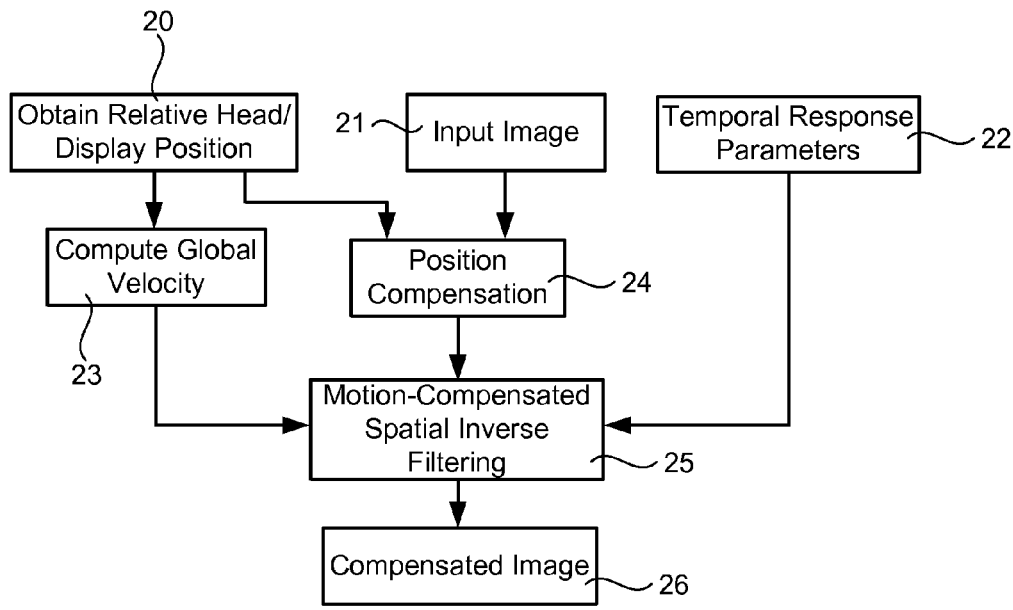
FIG. 2 is a chart showing an exemplary embodiments of the present invention comprising position compensation and filtering.

Some embodiments of the present invention may be described in relation to FIG. 2. In these embodiments, a relative head-to-display position is received 20. This may be calculated through position sensors located on a user's head and on a display, as described above. In some embodiments, the head position may be determined with a sensor in the display that measures the relative position of the user's head or with a sensor attached to the user's head that measures the relative position of the display. Other methods may also be used to determine a relative position of the user's head in relation to a display. An input image 21 may also be received. In some embodiments, the input image 21 may be a video frame or field. In some embodiments, the relative position of the head may be compared to past head position data to determine relative movement of the head in relation to a past head position. The relative head position 20 may be used to determine position compensation 24. In some embodiments, position compensation 24 may comprise shifting the image relative to the display in the direction of the user's head position. In some embodiments, position compensation 36 may comprise a zoom function. In other embodiments, position compensation 24 may comprise other compensation methods described above or other methods related to a user's head position, movement direction, velocity, acceleration or other characteristics.

In some embodiments, a global velocity may also be calculated 23. A global velocity may be calculated based on the current relative head position and past relative head positions. Temporal response parameters of the display 22 may also be received or calculated. The global velocity 23 and temporal response parameters 22 may be input to a filtering process 25. The filtering process may comprise generation and or application of a filter to compensate for motion-related blur and/or display blur caused by display response restrictions or other display characteristics. In some embodiments, the filtering process 25 may comprise motion-compensated spatial inverse filtering. In these embodiments, an image 21 is modified 24 to compensate for head position and then filtered 25 to compensate for motion-related and/or display-related blur and other effects. The result of these processes is a compensated image 26.

Figure 3:
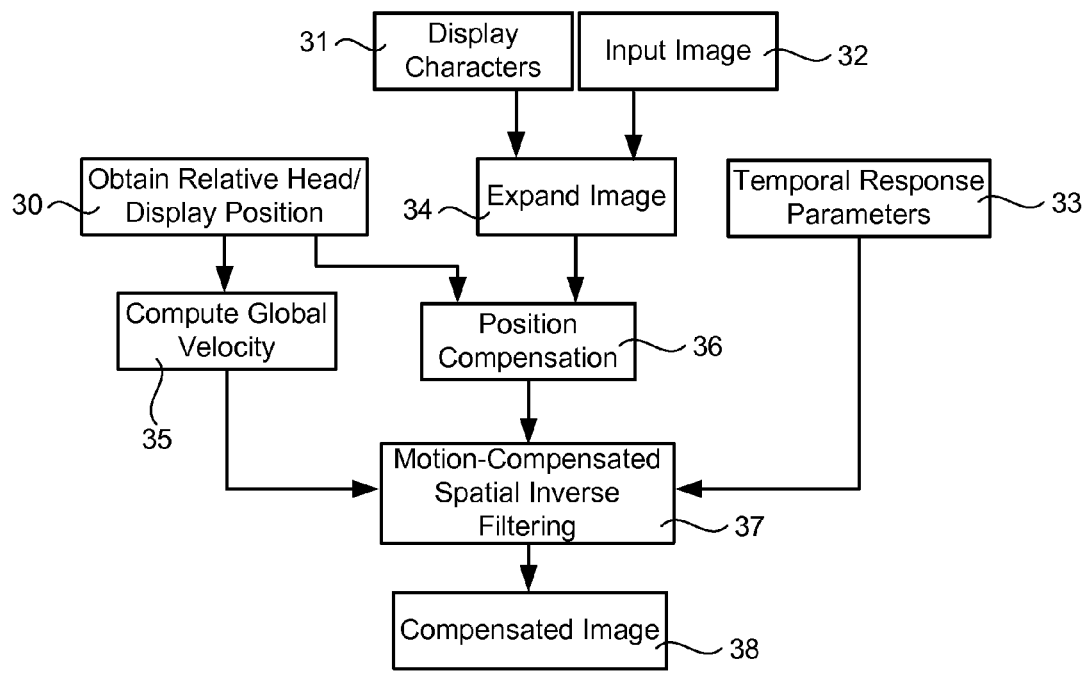
FIG. 3 is a chart showing an exemplary embodiments of the present invention comprising image expansion, position compensation and image filtering.

Some embodiments of the present invention may be described with reference to FIG. 3. In these embodiments, an input image 32 may also be received. In some embodiments, the input image 32 may be a video frame or field. Display characteristics 31 may also be received. Based on the display characteristics 31 and the input image 32 characteristics, the input image may be expanded or otherwise modified 34. In some embodiments, when an image is large enough, an image modification process 34 may not need to modify the input image and may simply pass the image on to the position compensation process 36. In other embodiments and situations, the image modification process 34 may upsample, scale or extrapolate an image to provide enough data for an image buffer that is larger than the associated display.

In some embodiments, a relative head-to-display position may also be received 30. This may be calculated through position sensors located on a user's head and on a display, as described above. In some embodiments, the head position may be determined with a sensor in the display that measures the relative position of the user's head or with a sensor attached to the user's head that measures the relative position of the display. Other methods may also be used to determine a relative position of the user's head in relation to a display. In some embodiments, the relative position of the head may be compared to past head position data to determine relative movement of the head in relation to a past head position. The relative head position 30 may be used to determine a position compensation 36. In some embodiments, position compensation 36 may comprise shifting the image relative to the display in the direction of the user's head position. In some embodiments, position compensation 36 may comprise a zoom function. In other embodiments, position compensation 36 may comprise other compensation methods described above or other methods related to a user's head position, movement direction, velocity, acceleration or other characteristics.

In some embodiments, a global velocity may also be calculated 35. A global velocity may be calculated based on the current relative head position and past relative head positions. Temporal response parameters of the display 33 may also be received or calculated. The global velocity 35 and temporal response parameters 33 may be input to a filtering process 37. The filtering process may comprise generation and or application of a filter to compensate for motion-related blur and/or display blur caused by display response restrictions or other display characteristics. In some embodiments, the filtering process 37 may comprise motion-compensated spatial inverse filtering. In these embodiments, an image 32 may be modified 34 to an adequate image size, modified 36 to compensate for head position and then filtered 37 to compensate for motion-related and/or display-related blur and other effects. The result of these processes is a compensated image 38.

Figure 4:
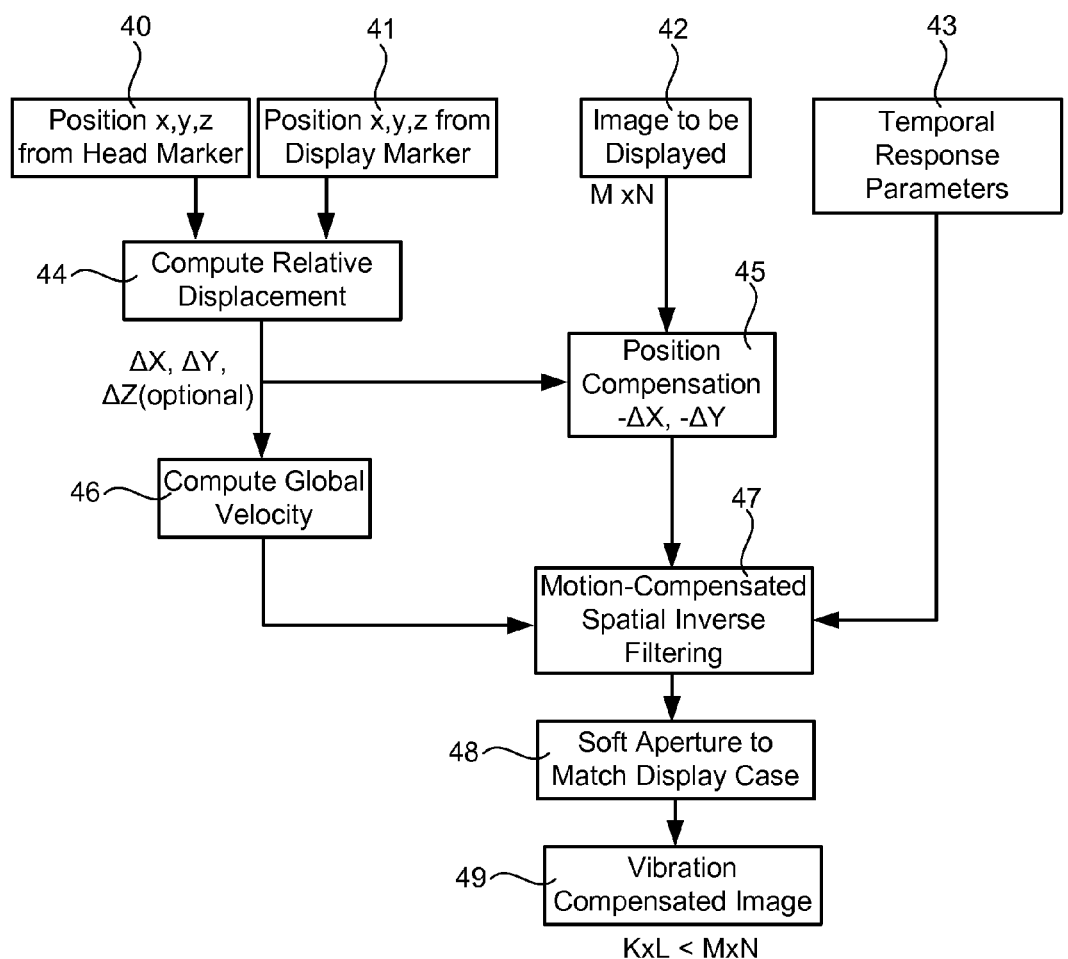
FIG. 4 is a chart showing an exemplary embodiments of the present invention comprising a soft aperture process.

Some embodiments of the present invention may be described with reference to FIG. 4. In these embodiments, an input image 42 may also be received. In some embodiments, the input image 42 may be a video frame or field. In some embodiments, a relative head-to-display position may also be received or calculated 44. This may be calculated through position sensors located on a user's head and on a display, as described above. In some embodiments, the head position may be determined with a sensor in the display that measures the relative position of the user's head or with a sensor attached to the user's head that measures the relative position of the display. In some embodiments, a head position coordinate 40 may be received. In some embodiments, a display position coordinate may be received 41. With these coordinates, a relative displacement of position may be calculated 44. Other methods may also be used to determine a relative position of the user's head in relation to a display. In some embodiments, the relative position of the head may be compared to past head position data to determine relative movement of the head in relation to a past head position. The relative head position 44 may be used to determine a position compensation 45. In some embodiments, position compensation 45 may comprise shifting the image relative to the display in the direction of the user's head position. In some embodiments, position compensation 45 may comprise a zoom function. In other embodiments, position compensation 45 may comprise other compensation methods described above or other methods related to a user's head position, movement direction, velocity, acceleration or other characteristics.

In some embodiments of the present invention, the distance between a viewer's head and the display may be monitored.

When the head-to-display distance changes, the display may perform a zoom function to compensate for the distance change. In some embodiments, the zoom process may be proportional to the change in distance between a user's head and the display.

In some embodiments, a global velocity may also be calculated 46. A global velocity 46 may be calculated based on the current relative head position and past relative head positions. Temporal response parameters of the display 43 may also be received or calculated. The global velocity 46 and temporal response parameters 43 may be input to a filtering process 47. The filtering process 47 may comprise generation and or application of a filter to compensate for motion-related blur and/or display blur caused by display response restrictions or other display characteristics. In some embodiments, the filtering process 47 may comprise motion-compensated spatial inverse filtering.

Some embodiments of the present invention may comprise a soft aperture process 48. In these embodiments, a region of pixels around the periphery of the display may be allocated as a soft aperture wherein the image transitions to the appearance of the display surround thereby eliminating or reducing hard edges around the display.

In these embodiments, an image 42 may be modified 45 to compensate for head position and then filtered 47 to compensate for motion-related and/or display-related blur and other effects. A soft aperture process 48 may then be applied to the modified and filtered image. The result of these processes is a compensated image 49.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for displaying a motion-compensated image, said method comprising:
   receiving an input image;
   receiving a position of a user's head relative to a display;
   determining a movement direction of said user's head relative to said display;
   performing an image modification process to expand the size of said input image to a size that is greater than the size of said display, wherein said modification process comprises at least one of image upsampling, image scaling and image extrapolation, thereby creating an expanded input image;
   modifying said expanded input image by shifting said expanded input image relative to said display in said movement direction; and
   filtering said modified expanded input image to compensate for image blur.

2. A method as described in claim 1 further comprising modifying said input image with a zoom operation in response to a distance between said user's head and said display.

3. A method as described in claim 1 wherein said filtering comprises a motion-compensated spatial inverse filtering operation.

4. A method as described in claim 1 further comprising applying a soft aperture region to said filtered, modified input image.

5. A method as described in claim 1 further comprising expanding said input image to a size that is larger than the size of said display.

6. A method as described in claim 1 wherein said receiving a position comprises receiving coordinates for said user's head and said display and calculating a relative position of said user's head with respect to said display.

7. A method as described in claim 1 wherein said filtering is based on temporal response parameters.

8. A method as described in claim 1 wherein said filtering is based on a global velocity of said image relative to said display.

9. A method as described in claim 1 wherein the extent of said soft aperture region varies with the magnitude of a change in said position of a user's head relative to said display.

10. A method as described in claim 1 wherein said soft aperture region comprises matching a color in a soft aperture region to a display surround color.

11. A system for displaying a motion-compensated image, said system comprising:
    a) an image receiver for receiving an input image;
    b) a position detector for detecting a position of a user's head relative to a display;
    c) an image processor for modifying said input image to expand the size of said input image to a size that is greater than the size of said display, wherein said modification process comprises at least one of image upsampling, image scaling and image extrapolation, said modifying also comprising shifting said image relative to said display in a direction toward said position of a user's head; and
    d) a filter for filtering said modified image to compensate for image blur.

12. A system as described in claim 11 wherein said image processor further modifies said input image with a zoom operation in response to a distance between said user's head and said display.

13. A system as described in claim 11 wherein said filtering comprises a motion-compensated spatial inverse filtering operation.

14. A system as described in claim 11 further comprising a soft aperture processor for applying a soft aperture region to said filtered, modified input image.

15. A system as described in claim 11 further comprising an image expander for expanding said input image to a size that is larger than the size of said display.

16. A system as described in claim 11 wherein said position detector receives coordinates for said user's head and said display and calculates a relative position of said user's head with respect to said display.

17. A system as described in claim 11 wherein said filtering is based on a temporal response parameter.

18. A system as described in claim 11 wherein said filtering is based on a global velocity of said image relative to said display.

19. A system as described in claim 11 wherein the extent of soft aperture region applied by said soft aperture processor varies with the magnitude of a change in said position of a user's head relative to said display.

20. A system as described in claim 11 wherein said soft aperture processor matches a color in a soft aperture region to a display surround color.

* * * * *